United States Patent [19]

Adams

[11] E Re. 31,052

[45] Reissued Oct. 12, 1982

[54] LACING ASSEMBLY FOR A SHOE

[75] Inventor: Thomas M. Adams, San Antonio, Tex.

[73] Assignee: Kaepa, Inc., San Antonio, Tex.

[21] Appl. No.: 232,854

[22] Filed: Feb. 9, 1981

Related U.S. Patent Documents

Reissue of:

[64] Patent No.: 4,200,998
Issued: May 6, 1980
Appl. No.: 910,774
Filed: May 30, 1978

[51] Int. Cl.[3] ..... A43B 11/00; F16G 11/04

[52] U.S. Cl. ..... 36/50; 24/117

[58] Field of Search ..... 36/50, 51, 102, 138; 12/113; 24/117 R, 140, 143

[56] References Cited

U.S. PATENT DOCUMENTS

| | | | |
|---|---|---|---|
| 2,611,940 | 9/1952 | Cairns | 24/140 |
| 3,108,385 | 10/1963 | Teufel | 36/50 |
| 3,193,950 | 7/1965 | Liou | 36/50 |
| 3,546,796 | 12/1970 | Adams | 36/102 |
| 3,845,575 | 11/1974 | Boden | 36/50 |
| 3,861,003 | 1/1975 | Boden | 24/117 R |
| 3,934,346 | 1/1976 | Sasari et al. | 36/50 X |

FOREIGN PATENT DOCUMENTS

| | | | |
|---|---|---|---|
| 869754 | 3/1953 | Fed. Rep. of Germany | 36/50 |
| 1374110 | 8/1964 | France | 24/117 R |

*Primary Examiner*—James Kee Chi
*Attorney, Agent, or Firm*—Cohn, Powell & Hind

[57] ABSTRACT

A lacing assembly for a shoe, and particularly an athletic shoe, in which the side quarters include separate lower and upper vamp sections that are secured by a single lace extending therebetween. A clamp connects the lace at the lower vamp section, while the lace is secured separately at the upper vamp section, for selectively adjusting and maintaining the fit of each vamp section independently of the other vamp section. The clamp is carried by the lace between the lower and upper vamp sections. More particularly, the clamp is slidably mounted on the lace for selectively moving down or up on the lace upon adjusting the fit of the lower vamp section, the clamp selectively fixing the lace to maintain the desired adjusted fit of the lower vamp section.

4 Claims, 5 Drawing Figures

LACING ASSEMBLY FOR A SHOE

Matter enclosed in heavy brackets [ ] appears in the original patent but forms no part of this reissue specification; matter printed in italics indicates the additions made by reissue.

BACKGROUND OF THE INVENTION

The invention relates generally to improvements in the lacing assembly of a shoe, and more particularly to an improved lacing assembly for an athletic shoe in which lower and upper vamp sections can be selectively adjusted and maintained to fit different portions of the foot independently while utilizing a single lace for and extending between the lower and upper vamp sections.

In applicant's prior U.S. Pat. No. 3,546,796, an athletic shoe is disclosed having separate lower and upper vamp sections. A pair of laces are provided, one lace for each vamp section. While each vamp section can be adjustably fitted and maintained by its own individual lace, it has been found to be disadvantageous to use a pair of separate laces for each shoe. For example, when untied, a pair of laces presents four loose ends that can become tangled and must be stored out into appropriate pairs before each vamp section can be adjustably fitted and tied. Moreover, when a pair of laces are tied, each lace provides a bow, thereby providing a pair of bows on each shoe that can become tangled and which present an unconventional and unacceptable appearance.

SUMMARY OF THE INVENTION

The present lacing assembly for a shoe, and particularly an athletic shoe, provides for selectively adjusting and maintaining the fit of lower and upper vamp sections independently of each other, while utilizing a lacing that presents only a conventional pair of loose ends when untied and a single conventional bow when tied.

In the present lacing assembly, a lacing means is provided for and extends between separate lower and upper vamp sections of the side quarters, and a securing means interconnects the lacing means at the lower vamp section, while the lacing means is secured separately at the upper vamp section, for selectively adjusting and maintaining the fit of each vamp section independently of the other vamp section.

The securing means connecting the lacing means at the lower vamp section is preferably located between the lower and upper vamp sections. More particularly, the securing means is a clamp selectively fixing or loosening the lacing means at the lower vamp section for adjusting the fit of the lower vamp section for the comfort of the wearer at the forward foot portion and toes, while the fit of the upper vamp section can be adjusted for the comfort of the wearer at the instep and arch of the foot.

The clamp is of a type that can be slidably mounted on the lacing means for selectively moving down or up on the lacing means upon adjusting the fit of the lower vamp section, and which can be selectively fixed to the lacing means to maintain the desired adjusted fit.

Preferably, the lacing means for and extending between the lower and upper vamp sections is a single lace.

DESCRIPTION OF THE PREFERRED EMBODIMENT

Figure 1:
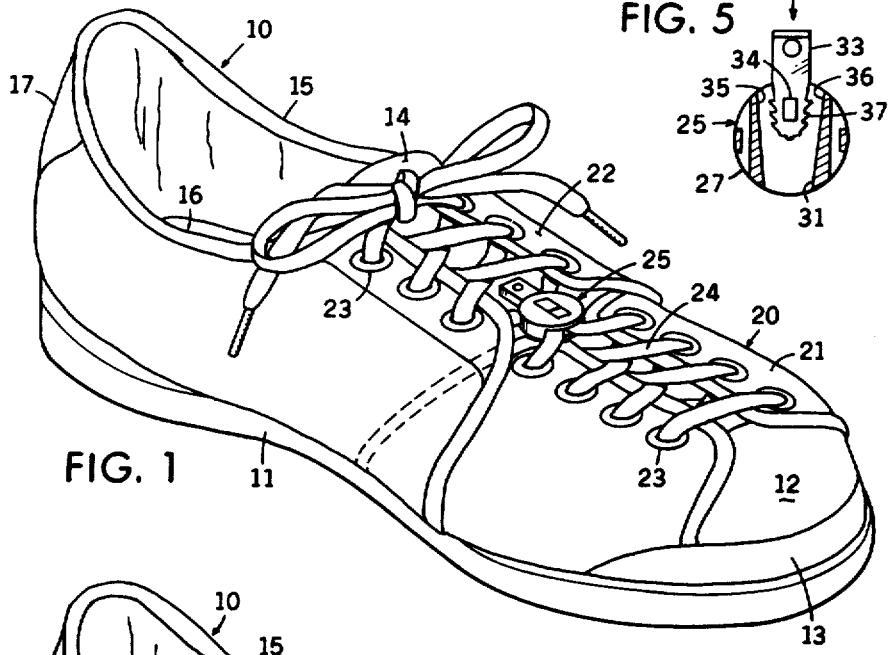
FIG. 1 is a perspective view of an athletic shoe incorporating the lacing assembly and illustrating both vamp sections secured.
Figure 2:
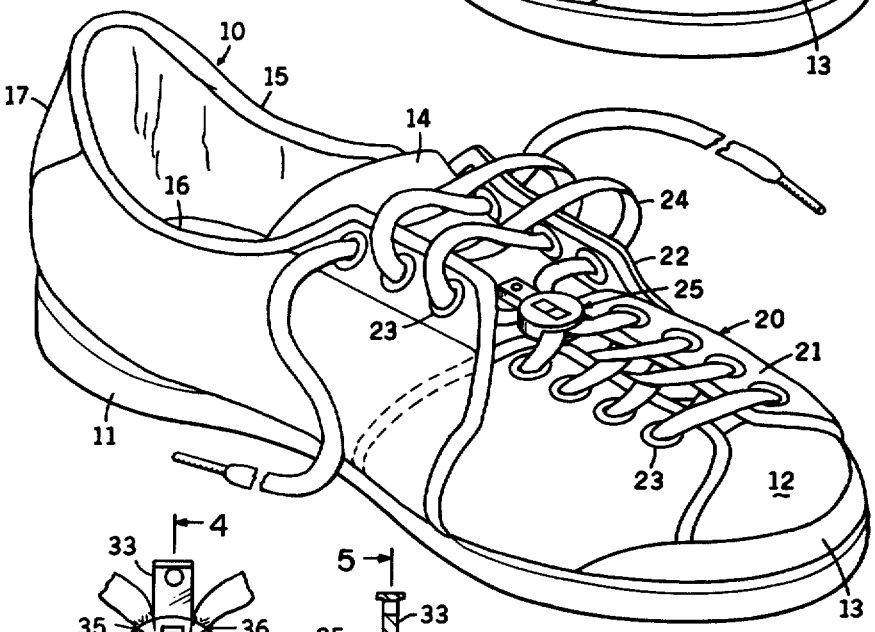
FIG. 2 is a perspective view similar to FIG. 1, but illustrating the upper vamp section loosened by the lace independently of the lower vamp section.

Referring now by characters of reference to the drawing, and first to FIGS. 1-2, it will be understood that the shoe generally indicated by 10 is of the type usually designated as an athletic shoe. The shoe 10 includes a sole 11, a toe cap 12 and a toe guard 13 along the front edge of the sole 11. A tongue 14 is attached to and extends upwardly from the top cap 12. The shoe 10 is provided with left and right side quarters 15 and 16 which are brought together at the rear in a heel 17. The side quarters 15-16 of shoe 10 overlay the tongue 14 and are adapted to overlay the instep, arch and forward foot portion and toes of the person wearing the shoe. This forward part of the side quarters 15-16 is known as the vamp referred to by 20.

The vamp 20 includes a lower vamp section 21 that overlies the forward foot portion and the toes, and an upper vamp section 22 that overlays the arch and instep of the foot. These vamp sections are constructed so that the upper vamp section 22 overlaps the upper part of the lower vamp section 21.

The associated pairs of panels defining the lower vamp section 21 and the upper vamp section 22 are provided with opposed eyelets 23. Lacing means 24 is provided for and extends between the lower and upper vamp sections 21-22. The lacing means 24 consists preferably of a single lace that is attached to the lowermost opposed pair of eyelets 23 of lower vamp section 21 and then criss-crossed into the other eyelets 23 in the conventional manner, and is then passed into the lowermost pair of opposed eyelets 23 of the upper vamp section 22 and is criss-crossed into the other eyelets 23 of upper vamp section 22. The ends of the lace can be selectively tied in a bow at the upper vamp section 22.

The clamp 25, constituting a securing means, connects the lacing means 24 at the lower vamp section, and is located between the lower and upper vamp sections 21-22. The clamp 25 selectively fixes or loosens the lacing means 24 at the lower vamp section 21 for adjusting the fit of the lower vamp section 21 for the comfort of the wearer independently of the upper vamp section 22.

Figure 5:
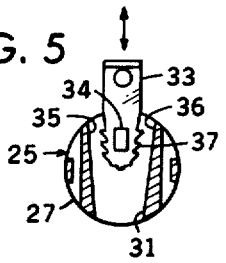
FIG. 5 is a cross-sectional view taken on line 5—5 of FIG. 4.
Figure 3:
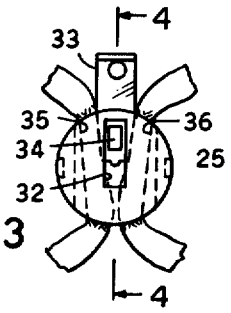
FIG. 3 is an enlarged, fragmentary, top plan view of the lacing clamp for the lower vamp section.
Figure 4:
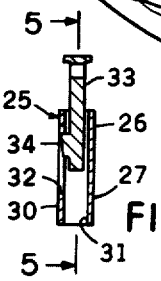
FIG. 4 is a cross-sectional view taken on line 4—4 of FIG. 3.

As is best shown in FIGS. 3-5, the clamp 25 includes a hollow body 26 having a back wall 27 and a front wall 30 with a chamber 31 therebetween. The front wall 30 is provided with an elongate guide slot 32.

Slidably mounted in the body chamber 31 is a lock plunger 33, the plunger 33 including a guide lug 34 that is slidably received in the guide slot 32. As is best illustrated in FIG. 5, the plunger 33 divides the chamber 31 into a pair of side passages 35 and 36 through which the lacing means 24 extends. The inner end of plunger 33 is provided with serrations 37 adapted to engage and grip the lacing means 24 when the lock plunger 33 is moved inwardly to its locked position relative to the lacing means 24.

When the lacing means 24 is disposed in the clamp 25, and particularly in the side passages 35-36, the clamp 25 can be slidably moved down or up on the lacing means 24, when the lock plunger 33 is moved to its extended, unlocked position. When the clamp 25 is moved to the desired selected position on the lacing means 24 incident to adjusting the fit of the lower vamp section 21 for the comfort of the wearer, the lock plunger 33 is depressed to its locking position in which the serrations 37 and the inner end of plunger 33 engage and fix the lacing means 24 in order to maintain the desired adjusted fit of the lower vamp section 21.

To assemble the clamp 25 on the lacing means 24, the lace is laced to the lower vamp section 21 in the manner previously described, and then the ends of the lace are passed through the side passages 35 and 36 of the clamp 25, and the clamp 25 is slidably moved along the lace until it is located at the top of the lower vamp section 21 and between the lower and upper vamp sections 21-22. Then, the ends of the lace are laced to the upper vamp section 22 in the manner previously described.

It is thought that the usage and functional advantages of this lacing assembly has become fully apparent from the foregoing detailed description of parts, but for completeness of disclosure, the adjustment of the fit of the lower and upper vamp sections 21-22 and the fixing of the lacing means 24 will be briefly described. It will be assumed that the lower and upper vamp sections 21-22 have been laced and the clamp 25 appropriately attached to the lacing means 24 and located between the lower and upper sections 21-22.

The lacing means 24 is loosened at both the lower and upper vamp sections 21-22 to allow for the easy insertion of the foot into the shoe 10. This is accomplished by untying the lacing means 24 at the upper vamp section 22 is necessary, and loosening the lacing means 24 at the upper vamp section 22. The clamp 25 is slidably moved upwardly on the lacing means 24 by releasing the clamp 25 by pulling the lock plunger 33 outwardly to its extended, unlocked position. Then the lacing means 24 can be loosened relative to the lower vamp section 21. The foot of the wearer can then be placed completely within the shoe.

The fit of the lower vamp section 21 is first adjusted by tightening the lacing means 24 at the top of the lower vamp section 21 until the forward foot portion and toes of the wearer are comfortably gripped by the lower vamp section 21. Then the clamp 25 is slidably moved down on the lacing means 24 to take up any slack in the lacing means 24 at the top of the lower vamp section 21, and the clamp 25 is fixed to the lacing means 24 to maintain the desired adjusted fit of the lower vamp section 21. As explained previously, the clamp 25 is fixed by pressing the lock plunger 33 inwardly into locking, wedging engagement with the lacing means 24.

Then the lacing means 24 of the upper vamp section 22 is tightened so that the upper vamp section 22 comfortably grips the instep and arch of the foot. It will be understood that this adjustment of the upper vamp section 22 is accomplished independently of and without disturbing the adjusted fit of the lower vamp section 21. The free ends of the lacing means 24 at the top of the upper vamp section 22 are then tied or otherwise secured, as is shown in FIG. 1.

The clamp 25 connects the lacing means 24 at the lower vamp section 21, while the lacing means 24 is secured separately at the upper vamp section 22, thereby enabling selective adjustment and maintenance of the fit of each vamp section 21-22 independently of the other vamp section. The clamp 25 is relatively small and is carried by the lacing means 24 and is located unobtrusively between the lower and upper vamp sections 21 and 22. Further, the clamp 25 and its location and connection to the lacing means 24 enables the use of a single lace for both the lower and upper vamp sections 21 and 22, and still provides for the independent adjustment of the fit of each vamp section.

I claim as my invention:

1. In a lacing assembly for a shoe:

(a) side quarters including separate lower and upper vamp sections, (b) a single, continuous lace having only one pair of ends, the single lace lacing both and extending between the lower and upper vamp sections, and having the one pair of lace ends selectively tied at the top of the upper vamp section, and (c) a clamp interconnecting the single lace at the top of the lower vamp section for selectively fixing or loosening the lace at the top of the lower vamp section and adjusting the fit of the lower vamp section for the comfort of the wearer independently of the upper vamp section, the said one pair of lace ends being separately, selectively tied at the top of the upper vamp section and adjusting the fit of the upper vamp section for the comfort of the wearer independently of the lower vamp section.

2. In a lacing assembly for a shoe as defined in claim 1, in which:

(d) the clamp is slidably mounted on the single lace, and located between the lower and upper vamp sections, the clamp being selectively movable down or up on the single lace upon adjusting the fit of the lower vamp section, and the clamp including means for selectively fixing the single lace at the top of the lower vamp section and maintaining the desired adjusted fit of the lower vamp section.

*3. In a lacing assembly for a shoe:*

*(a) a vamp having adjacent vamp sections,*

*(b) a single, continuous lace having only one pair of ends, the single lace lacing both vamp sections, and having the one pair of lace ends selectively tied at one of the vamp sections, and*

*(c) a clamp interconnecting the single lace at the other of said vamp sections for selectively fixing or loosening the lace and maintaining the lace at the said other vamp section for the comfort of the wearer independently of the said one vamp section, the said one pair of lace ends being separately, selectively tied at the said one vamp section and adjusting the fit of the said one vamp section for the comfort of the wearer independently of the said other vamp section.*

*4. In a lacing assembly for a shoe:*

*(a) side quarters including a vamp having lower and upper vamp sections,*

*(b) a single, continuous lace having only one pair of ends, the single lace lacing both lower and upper vamp sections, and having the one pair of lace ends selectively tied at the upper vamp section, and*

*(c) a clamp interconnecting the single lace at the lower vamp section for selectively fixing or loosening the lace at the lower vamp section and adjusting and maintaining the fit of the lower vamp section for the comfort of the wearer independently of the upper vamp section, the said one pair of lace ends being separately, selectively tied at the upper vamp section and adjusting the fit of the upper vamp section for the comfort of the wearer independently of the lower vamp section.*

* * * * *